US012216354B2

(12) United States Patent
Nakamura

(10) Patent No.: US 12,216,354 B2
(45) Date of Patent: Feb. 4, 2025

(54) DISPLAY DEVICE

(71) Applicant: Japan Display Inc., Tokyo (JP)

(72) Inventor: Tenfu Nakamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/522,468

(22) Filed: Nov. 29, 2023

(65) Prior Publication Data

US 2024/0176182 A1    May 30, 2024

(30) Foreign Application Priority Data

Nov. 29, 2022  (JP) .................. 2022-189987

(51) Int. Cl.
*G02F 1/13357* (2006.01)
*F21V 8/00* (2006.01)
*G02F 1/137* (2006.01)

(52) U.S. Cl.
CPC ......... *G02F 1/1336* (2013.01); *G02B 6/0065* (2013.01); *G02B 6/0068* (2013.01); *G02B 6/0076* (2013.01); *G02B 6/0088* (2013.01); *G02F 1/13775* (2021.01); *G02F 2202/28* (2013.01)

(58) Field of Classification Search
CPC .............. G02F 1/1336; G02F 1/13775; G02F 2202/28; G02B 6/0065; G02B 6/0068; G02B 6/0076; G02B 6/0088
See application file for complete search history.

(56) References Cited

U.S. PATENT DOCUMENTS

| | | | | |
|---|---|---|---|---|
| 11,275,284 | B2* | 3/2022 | Numata | G02F 1/13347 |
| 2009/0154198 | A1* | 6/2009 | Lee | G02B 6/0081 |
| | | | | 362/624 |
| 2009/0167990 | A1* | 7/2009 | Konno | G09G 3/3426 |
| | | | | 349/65 |
| 2011/0116013 | A1 | 5/2011 | Sano et al. | |
| 2014/0029298 | A1* | 1/2014 | Hyun | G02B 6/0068 |
| | | | | 362/326 |
| 2018/0011353 | A1* | 1/2018 | Wang | G02B 6/0025 |
| 2019/0041673 | A1* | 2/2019 | Numata | G09G 3/36 |
| 2019/0302496 | A1 | 10/2019 | Okuyama | |
| 2022/0179269 | A1 | 6/2022 | Ikeda et al. | |

FOREIGN PATENT DOCUMENTS

| | | |
|---|---|---|
| JP | 2011-107229 A | 6/2011 |
| JP | 2019-174531 A | 10/2019 |
| JP | 2021-033017 A | 3/2021 |

* cited by examiner

*Primary Examiner* — Mary Ellen Bowman
(74) *Attorney, Agent, or Firm* — Maier & Maier, PLLC

(57) ABSTRACT

According to one embodiment, a display device includes a display panel displaying an image, a light guide overlapping with the display panel and including a first side surface, and a light source emitting light to the first side surface. The light guide includes a first transparent substrate, a second transparent substrate provided between the display panel and the first transparent substrate, and a first adhesive layer bonding the first transparent substrate to the second transparent substrate. A thickness of the second transparent substrate is different from a thickness of the first transparent substrate.

2 Claims, 6 Drawing Sheets

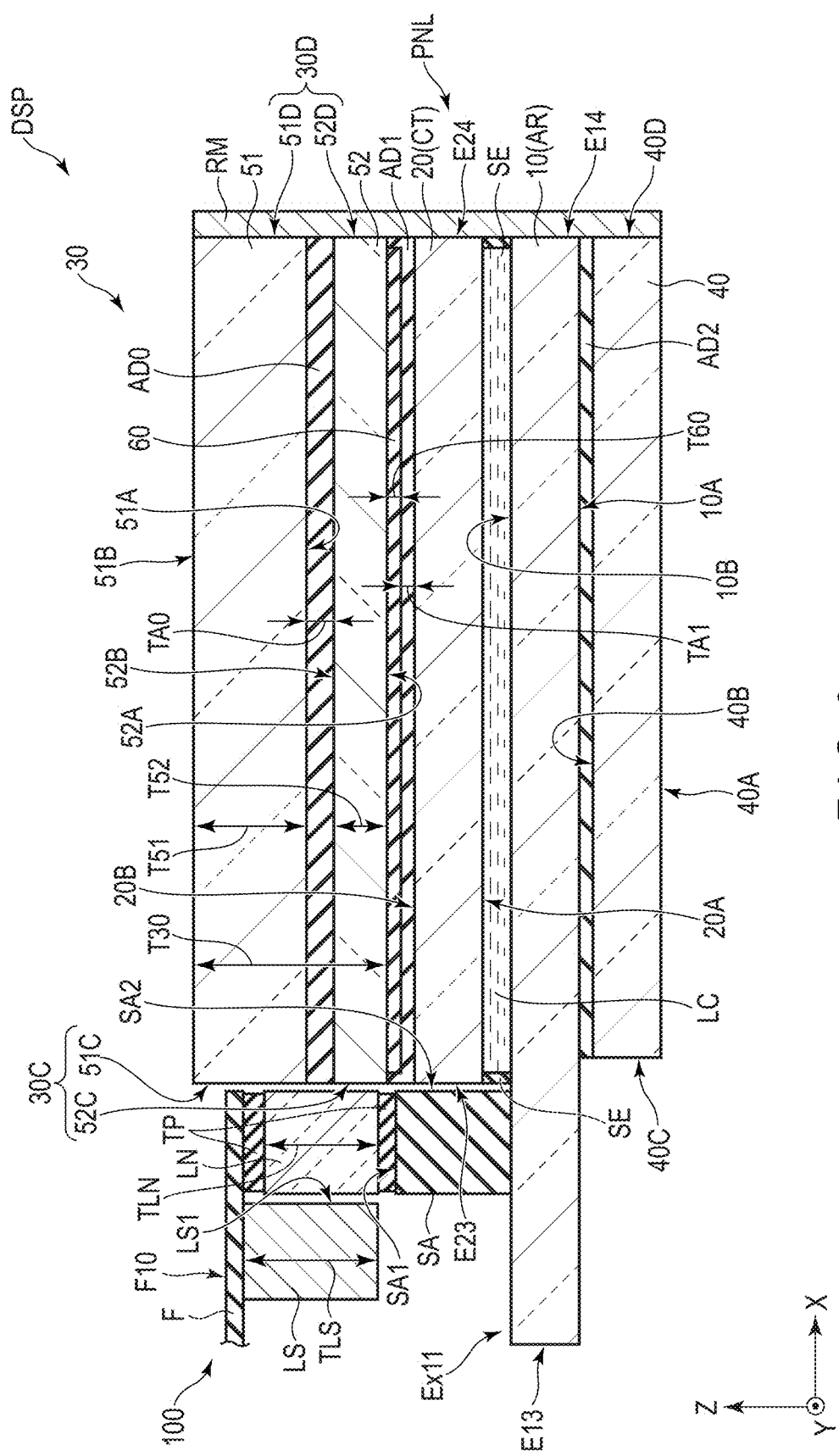
F I G. 6

DISPLAY DEVICE

CROSS-REFERENCE TO RELATED APPLICATIONS

This application is based upon and claims the benefit of priority from Japanese Patent Application No. 2022-189987, filed Nov. 29, 2022, the entire contents of which are incorporated herein by reference.

Embodiments described herein relate generally to a display device.

BACKGROUND

In recent years, a display device comprising a display panel including a polymer dispersed liquid crystal layer (PDLC) has been proposed. The polymer dispersed liquid crystal layer can switch a scattering state in which light is scattered and a transparent state in which light is transmitted. The display device can display images by switching the display panel to the scattering state. In contrast, the user can visually recognize a background through the display panel by switching the display panel to the transparent state.

BRIEF DESCRIPTION OF THE DRAWINGS

FIG. 6 is a cross-sectional view schematically showing a configuration example of the display device.

DETAILED DESCRIPTION

Figure 1:
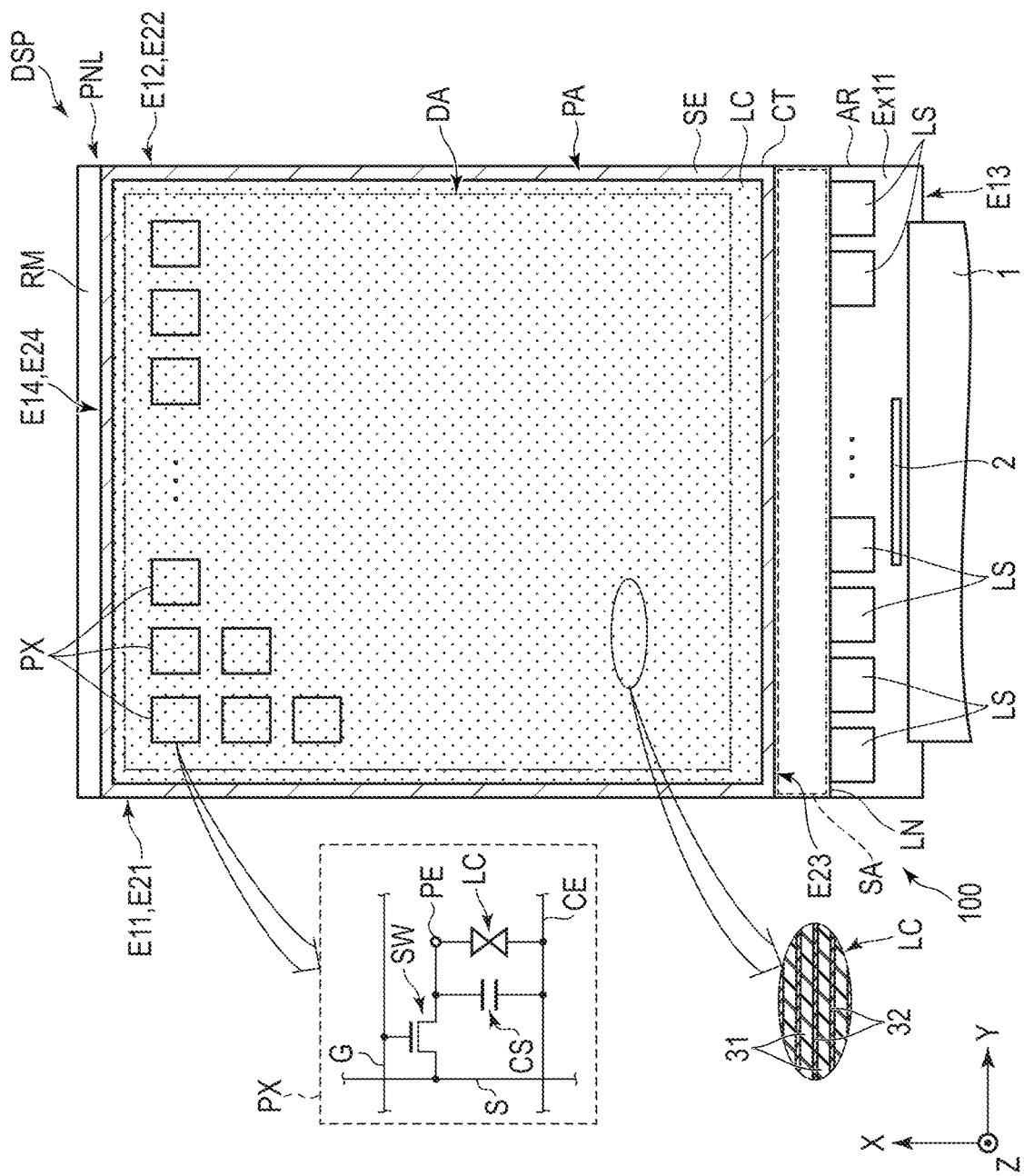
FIG. 1 is a plan view showing a configuration example of a display device according to one of embodiments.

In general, according to one embodiment, a display device comprises a display panel displaying an image, a light guide overlapping with the display panel and including a first side surface, and a light source emitting light to the first side surface. The light guide includes a first transparent substrate, a second transparent substrate provided between the display panel and the first transparent substrate, and a first adhesive layer bonding the first transparent substrate to the second transparent substrate. A thickness of the second transparent substrate is different from a thickness of the first transparent substrate.

According to the embodiment, a display device capable of suppressing the degradation in display quality can be provided.

One of embodiments will be described hereinafter with reference to the accompanying drawings. Note that the disclosure is presented for the sake of exemplification, and any modification and variation conceived within the scope and spirit of the invention by a person having ordinary skill in the art are naturally encompassed in the scope of invention of the present application. In addition, in some cases, in order to make the description clearer, the drawings may be more schematic than in the actual modes, but they are mere examples, and do not limit the interpretation of the present invention.

In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In the present embodiment, a first direction X, a second direction Y, and a third direction Z are defined as shown in each figure. The first direction X, the second direction Y, and the third direction z are orthogonal to each other, but may intersect each other at an angle other than 90 degrees. In addition, in the present embodiment, the third direction Z is defined as an upper or upward direction, and a direction opposite to the third direction Z is defined as a lower or downward direction.

Expressions such as "a second component above a first component" and "a second component below a first component" mean that the second component may be in contact with the first component or may be located separately from the first component. Viewing an X-Y plane defined by the first direction X and the second direction Y is hereinafter referred to as plan view.

In the present embodiment, a liquid crystal display device which enables a background to be visually recognized, to which polymer dispersed liquid crystal is applied, is disclosed as an example of the display device. The present embodiment does not prevent application of individual technical ideas disclosed in the present embodiment to the other types of display devices.

FIG. 1 is a plan view showing a configuration example of a display device DSP according to the present embodiment. As shown in FIG. 1, the display device DSP comprises a display panel PNL including a polymer dispersed liquid crystal layer (hereinafter simply referred to as a liquid crystal layer LC), a wiring board 1, an IC chip 2, a light source unit 100, and a reflective material RM. The display device DSP further comprises a light guide 30 and a cover member 40, which will be described below.

The display panel PNL includes an array substrate AR, a counter-substrate CT opposed to the array substrate AR, a liquid crystal layer LC, and a seal SE. The array substrate AR and the counter-substrate CT are formed in flat plate shapes parallel to the X-Y plane. The array substrate AR and the counter-substrate CT overlap in plan view.

The array substrate AR and the counter-substrate CT are bonded by the seal SE. The liquid crystal layer LC is arranged between the array substrate AR and the counter-substrate CT and is sealed by the seal SE. In FIG. 1, the liquid crystal layer LC is represented by dots and the seal SE is represented by hatch lines.

As enlarged and schematically shown in FIG. 1, the liquid crystal layer LC contains polymer 31 and liquid crystal molecules 32. As an example, the polymer 31 is a liquid crystal polymer. The polymer 31 is formed in a stripe shape extending along the second direction Y and is aligned in the first direction X.

The liquid crystal molecules 32 are dispersed in gaps of the polymer 31 and aligned such that their long axes extend along the second direction Y. The polymer 31 and the liquid crystal molecules 32 have optical anisotropy or refractive anisotropy. The response performance of the polymer 31 to the electric field is lower than the response performance of the liquid crystal molecules 32 to the electric field.

As an example, the alignment direction of the polymers 31 is hardly varied irrespective of the presence or absence of the electric field. In contrast, the alignment direction of the liquid crystal molecules 32 is varied in accordance with the electric field in a state in which a voltage higher than or equal to the threshold value is applied to the liquid crystal layer LC.

For example, in a state in which the voltage is not applied to the liquid crystal layer LC, optical axes of the polymer 31 and the liquid crystal molecules 32 are parallel to each other, and the light made incident on the liquid crystal layer LC is not substantially scattered in the liquid crystal layer LC but is transmitted (transparent state).

In a state in which the voltage is applied to the liquid crystal layer LC, the optical axes of the polymer 31 and the liquid crystal molecules 32 intersect each other and the light made incident on the liquid crystal layer LC is scattered in the liquid crystal layer LC (scattered state). In other words, in the liquid crystal layer LC, the transparent state and the scattered state can be switched in accordance with the applied voltage.

The display panel PNL includes a display area DA in which images are displayed and a surrounding area PA which surrounds the display area DA. The seal SE is located in the surrounding area PA. The display area DA includes pixels PX arrayed in a matrix in the first direction X and the second direction Y.

As shown and enlarged in FIG. 1, each pixel PX comprises a switching element SW, a pixel electrode PE, a common electrode CE, a liquid crystal layer LC, and the like. The switching element SW is constituted by, for example, a thin-film transistor (TFT) and is electrically connected to a scanning line G and a signal line S.

The scanning line G is electrically connected to the switching element SW in each of the pixels PX arranged in the second direction Y. The signal line S is electrically connected to the switching element SW in each of the pixels PX arranged in the first direction X.

The pixel electrode PE is electrically connected to the switching element SW. The common electrode CE is provided commonly to a plurality of pixel electrodes PE. The liquid crystal layer LC (particularly, liquid crystal molecules 32) is driven by an electric field produced between the pixel electrode PE and the common electrode CE. A capacitance CS is formed, for example, between the common electrode CE and an electrode having the same potential and between the pixel electrode PE and an electrode having the same potential.

The scanning line G, the signal line S, the switching element SW, and the pixel electrode PE are provided on the array substrate AR, and the common electrode CE is provided on the counter-substrate CT, which will be described with reference to FIG. 2. On the array substrate AR, the scanning line G and the signal line S are electrically connected to the wiring board 1 or the IC chip 2.

The array substrate AR has a pair of side surfaces E11 and E12 extending in the first direction X and a pair of side surfaces E13 and E14 extending in the second direction Y. In the example shown in FIG. 1, the pair of side surfaces E11 and E12 are side surfaces formed along the long sides of the display panel PNL, and the pair of side surfaces E13 and E14 are side surfaces formed along the short sides of the display panel PNL.

The counter-substrate CT has a pair of side surfaces E21 and E22 extending in the first direction X and a pair of side surfaces E23 and E24 extending in the second direction Y. In the example shown in FIG. 1, the pair of side surfaces E21 and E22 are side surfaces formed along the long sides, and the pair of side surfaces E23 and E24 are side surfaces formed along the short sides.

In the example shown in FIG. 1, the side surface E11 overlaps with the side surface E21 in plan view, but may not overlap with the side surface E21. In the example shown in FIG. 1, the side surface E12 overlaps with the side surface E22 in plan view, but may not overlap with the side surface E22. In the example shown in FIG. 1, the side surface E14 overlaps with the side surface E24 in plan view, but may not overlap with the side surface E24.

The array substrate AR includes an extending portion Ex11 which extends beyond the side surface E23 of the counter-substrate CT. From another viewpoint, the extending portion Ex11 does not overlap with the counter-substrate CT. The extending portion Ex11 is located between the side surface E13 and the side surface E23. The wiring board 1 and the IC chip 2 are mounted on the extending portion Ex11.

The wiring board 1 is, for example, a flexible printed circuit which can be bent. The IC chip 2 incorporates, for example, a display driver which outputs signals necessary for image display, and the like. The IC chip 2 may be mounted on the wiring board 1.

In the example shown in FIG. 1, the display device DSP comprises a single wiring board 1, but may comprise a plurality of wiring boards. The display device DSP comprises a single IC chip 2 but may comprise a plurality of IC chips.

In the example shown in FIG. 1, the light source unit 100 overlaps with the extending portion Ex11 in plan view. The light source unit 100 includes a plurality of light sources LS, a lens LN, and a support member SA. The plurality of light sources LS are spaced apart and arranged in the second direction Y.

In the light sources LS, red LEDs, green LEDs, and blue LEDs are continuously aligned. The light sources LS are not limited to an arrangement in which LEDs of three different colors are continuously aligned but, for example, only white light sources emitting white light may be continuously aligned.

The lens LN (for example, prism lens) is formed in a transparent rod shape and extends in the second direction Y. The lens LN is formed of, for example, resin. The lens LN has, for example, a plurality of curved surfaces corresponding to the plurality of light sources LS. The lens LN may be composed of a plurality of lenses. The number of light sources LS and the number of lenses LN are not limited to the examples shown in the figure.

The reflective material RM is provided on a side opposite to the light source unit 100 in the first direction X. The reflective material RM is provided along the second direction Y. The reflective material RM is formed of, for example, a metal material having a light reflectivity, such as silver. The reflective material RM is, for example, a reflective tape.

Figure 2:
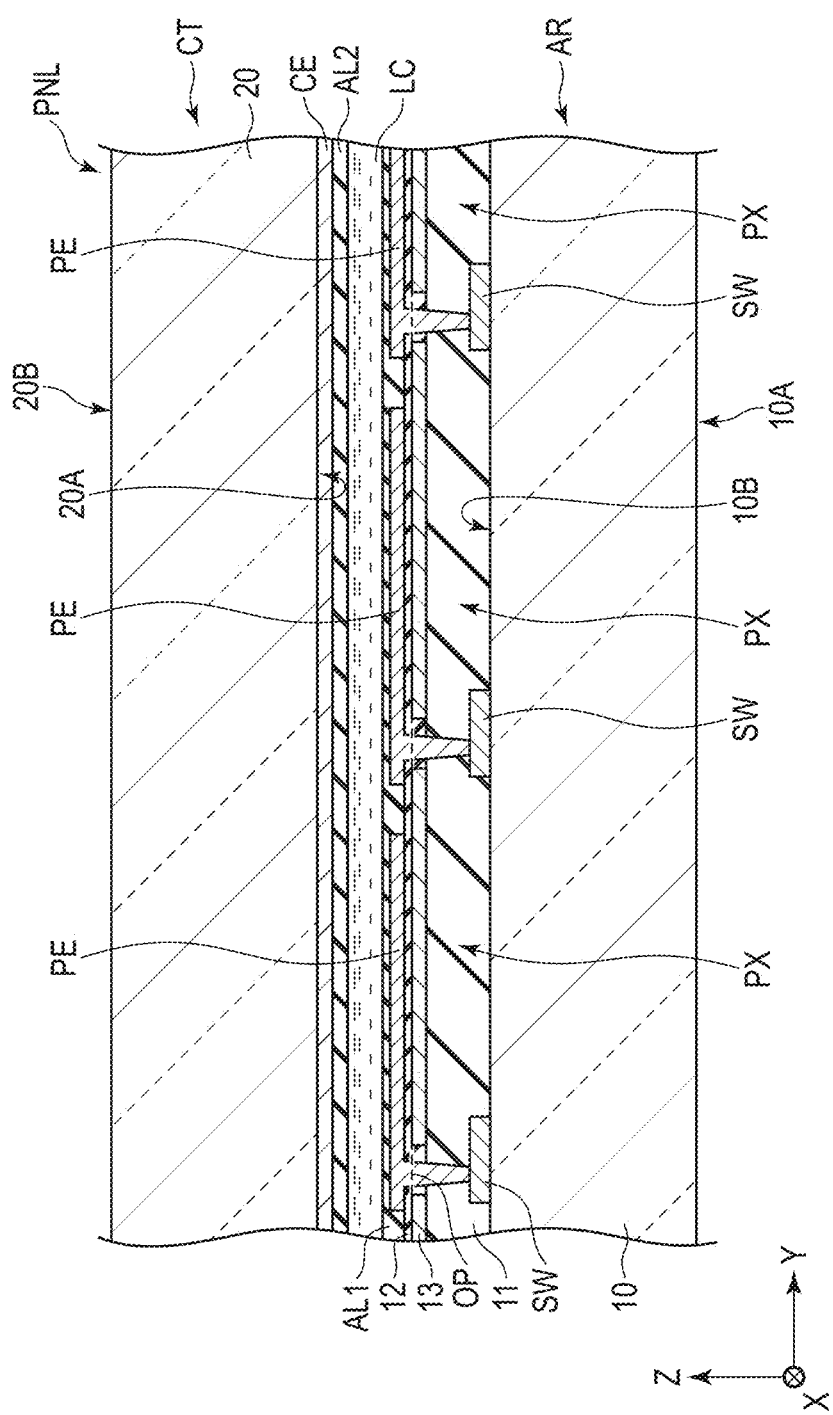
FIG. 2 is a cross-sectional view showing a configuration example of the display panel shown in FIG. 1.

FIG. 2 is a cross-sectional view showing a configuration example of the display panel PNL shown in FIG. 1. The array substrate AR includes a transparent substrate 10, insulating films 11 and 12, a capacitive electrode 13, switching elements SW, the pixel electrodes PE, and an alignment film AL1. The transparent substrate 10 has a main surface 10A and a main surface 10B on a side opposite to the main surface 10A.

The switching elements SW are provided on the main surface 10B side. The insulating film 11 is provided on the main surface 10B and covers the switching elements SW. The scanning lines G and the signal lines S described with reference to FIG. 1 are provided between the transparent substrate 10 and the insulating film 11, but their illustration is omitted here. The capacitive electrode 13 is provided between the insulating films 11 and 12.

The pixel electrode PE is provided between the insulating film 12 and the alignment film AL1, in each of the pixels PX. From another viewpoint, the capacitive electrode 13 is provided between the transparent substrate 10 and the pixel electrodes PE. The pixel electrodes PE are electrically connected to the switching elements SW through opening portions OP of the capacitive electrode 13. The pixel electrodes PE overlap with the capacitive electrode 13 through the insulating film 12 and form the capacitor CS of the pixel PX. The alignment film AL1 covers the pixel electrodes PE.

The counter-substrate CT includes a transparent substrate 20, the common electrode CE, and an alignment film AL2. The transparent substrate 20 has a main surface 20A and a main surface 20B on a side opposite to the main surface 20A. The main surface 20A of the transparent substrate 20 is opposed to the main surface 10B of the transparent substrate 10.

The common electrode CE is provided on the main surface 20A. The alignment film AL2 covers the common electrode CE. The liquid crystal layer LC is located between the main surface 10B and the main surface 20A and is in contact with the alignment films AL1 and AL2.

In the counter-substrate CT, a light-shielding layer may be provided just above each of the switching elements SW, the scanning lines G, and the signal lines S. A transparent insulating film may be provided between the transparent substrate 20 and the common electrode CE or between the common electrode CE and the alignment film AL2.

The common electrode CE is arranged over the plurality of pixels PX and is opposed to the plurality of pixel electrodes PE. The common electrode CE has the same potential as the capacitive electrode 13. The liquid crystal layer LC is located between the pixel electrodes PE and the common electrode CE.

The transparent substrates 10 and 20 are, for example, glass substrates but may be insulating substrates such as plastic substrates. The main surfaces 10A and 10B, and the main surfaces 20A and 20B are the surfaces substantially parallel to the X-Y plane. The insulating film 11 includes, for example, a transparent inorganic insulating film of silicon oxide, silicon nitride, silicon oxynitride or the like, and a transparent organic insulating film of acrylic resin or the like.

The insulating film 12 is, for example, a transparent inorganic insulating film of silicon nitride or the like. The capacitive electrode 13, the pixel electrodes PE, and the common electrode CE are, for example, transparent electrodes formed of a transparent conductive material such as indium tin oxide (ITO) or indium zinc oxide (IZO).

The alignment films AL1 and AL2 are horizontal alignment films having an alignment restriction force substantially parallel to the X-Y plane. As an example, the alignment films AL1 and AL2 are subjected to alignment treatment in the second direction Y. Incidentally, the alignment treatment may be a rubbing treatment or an optical alignment treatment.

Figure 3:
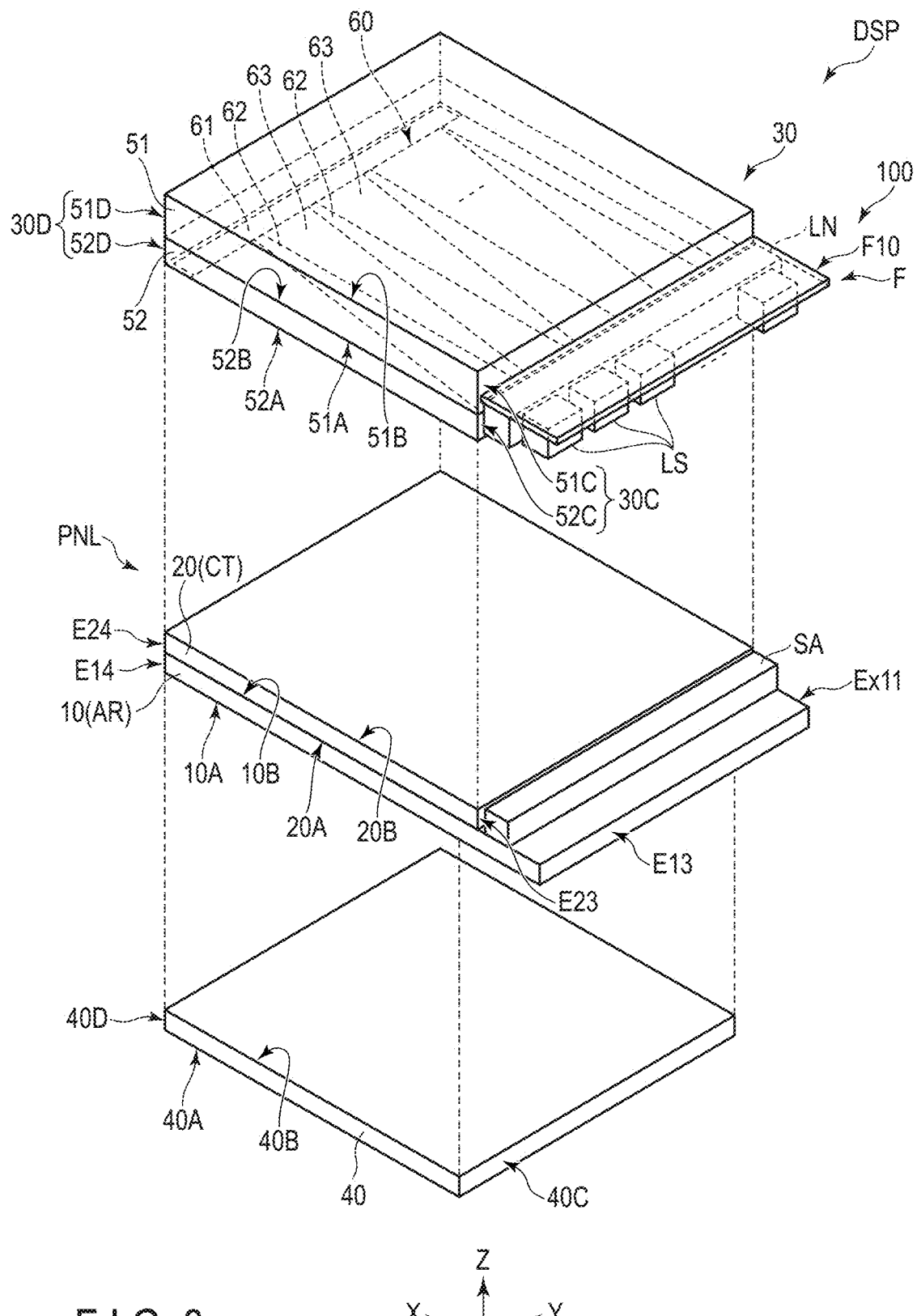
FIG. 3 is an exploded perspective view showing main portions of the display device shown in FIG. 1.

FIG. 3 is an exploded perspective view showing main portions of the display device shown in FIG. 1. In FIG. 3, the reflective material RM and the like are partially omitted.

As described with reference to FIG. 1, the display device DSP comprises the display panel PNL and the light source unit 100. The display device DSP further comprises the light guide 30 which overlaps with the display panel PNL, and a cover member 40.

The light guide 30 includes a transparent substrate 51 (first transparent substrate), a transparent substrate 52 (second transparent substrate), and a low-refractive layer 60. The transparent substrate 52 is provided between the display panel PNL and the transparent substrate 51. The cover member 40, the array substrate AR, the counter-substrate CT, the transparent substrate 52, and the transparent substrate 51 are aligned in this order along the third direction Z.

The transparent substrates 51 and 52 are formed in a flat plate shape. The transparent substrates 51 and 52 are, for example, glass substrates but may be insulating substrates such as plastic substrates. A transparency of the transparent substrate 52 is, for example, substantially equivalent to a transparency of the transparent substrate 51. In plan view, the size of the transparent substrate 51 is substantially equivalent to the size of the transparent substrate 52.

The transparent substrate 51 has a main surface 51A (second main surface), a main surface 51B (third main surface) on a side opposite to the main surface 51A, and a pair of side surfaces 51C and 51D that connect the main surface 51A with the main surface 51B.

The main surfaces 51A and 51B are the surfaces substantially parallel to the X-Y plane. The main surface 51A is opposed to the transparent substrate 52. The pair of side surfaces 51C and 51D are the surfaces substantially parallel to a Y-Z plane defined by the second direction Y and the third direction Z. The side surface 51D is a side surface on a side opposite to the side surface 51C in the first direction X.

The transparent substrate 52 has a main surface 52A (first main surface), a main surface 52B on a side opposite to the main surface 52A, and a pair of side surfaces 52C and 52D that connect the main surface 52A with the main surface 52B. The side surface 52C corresponds to the second side surface, and the side surface 52D corresponds to the third side surface. A direction from the side surface 52C to the side surface 52D corresponds to the first direction X.

The main surfaces 52A and 52B are the surfaces substantially parallel to the X-Y plane. The main surface 52A is opposed to the main surface 20B of the transparent substrate 20, and the main surface 52B is opposed to the main surface 51A of the transparent substrate 51. The pair of side surfaces 52C and 52D are the surfaces substantially parallel to the Y-Z plane. The side surface 52D is a side surface on a side opposite to the side surface 52C in the first direction X.

The light guide 30 further includes a side surface 30C (first side surface) located on the light source unit 100 side, and a side surface 30D on a side opposite to the side surface 30C. The side surface 30C includes the side surface 51C of the transparent substrate 51 and the side surface 52C of the transparent substrate 52.

The side surface 30D includes the side surface 51D of the transparent substrate 51 and the side surface 52D of the transparent substrate 52. In the example shown in FIG. 3, the side surface 51C is located directly above the side surface 52C, and the side surface 51D is located directly above the side surface 52D.

The low-refractive layer 60 is formed on the main surface 52A. A refractive index of the low-refractive layer 60 is smaller than a refractive index of the transparent substrates 51 and 52. The low-refractive layer 60 is formed of, for example, an organic material such as siloxane-based resin.

The low-refractive layer 60 includes a base 61, a plurality of band portions 62, and a plurality of apertures 63 formed between the plurality of band portions 62. The low-refractive layer 60 is in contact with the main surface 52A at the plurality of band portions 62. The main surface 52A is exposed in the plurality of apertures 63.

The cover member 40 overlaps with the display panel PNL on a side opposite to the light guide 30 in the third direction Z. The cover member 40 is formed in a flat plate shape. The cover member 40 is an insulating substrate such as a glass substrate, a plastic substrate, and the like. The cover member 40 has a main surface 40A, a main surface 40B on a side opposite to the main surface 40A, and a pair of side surfaces 40C and 40D that connect the main surface 40A with the main surface 40B.

The main surfaces 40A and 40B are the surfaces substantially parallel to the X-Y plane. The main surface 40B is opposed to the main surface 10A of the transparent substrate 10. The pair of side surfaces 40C and 40D are the surfaces substantially parallel to the Y-Z plane. The light guide 30 and the cover member 40 do not overlap with the extending portion Ex11 in the third direction Z.

As described with reference to FIG. 1, the light source unit 100 includes the light sources LS, the lens LN, and the support member SA. The light source unit 100 further includes a wiring board F. The plurality of light sources LS are mounted on the wiring board F.

The wiring board F is, for example, a printed circuit substrate and is more rigid than the wiring board 1 shown in FIG. 1. The wiring board F has an upper surface F10. The upper surface F10 is a surface on a side opposite to the surface on which the light sources LS are mounted.

The plurality of light sources LS and the lens LN are opposed to the side surface 30C in the first direction X. The plurality of light sources LS emit light toward the side surface 30C. The lens LN is located between the light guide 30 and the light sources LS in the first direction X. The support member SA is located between the extending portion Ex11 and the lens LN in the third direction Z.

The support member SA is a rod-shaped member extending in the second direction Y. The support member SA is formed of acrylic resin, glass, or the like, as an example, but is not limited to this example. The support member SA is desirably formed of an opaque and untransparent material. Incidentally, the support member SA may be a single member or may be composed of a plurality of members.

Next, the shape of the low-refractive layer 60 will be described.

Figure 4:
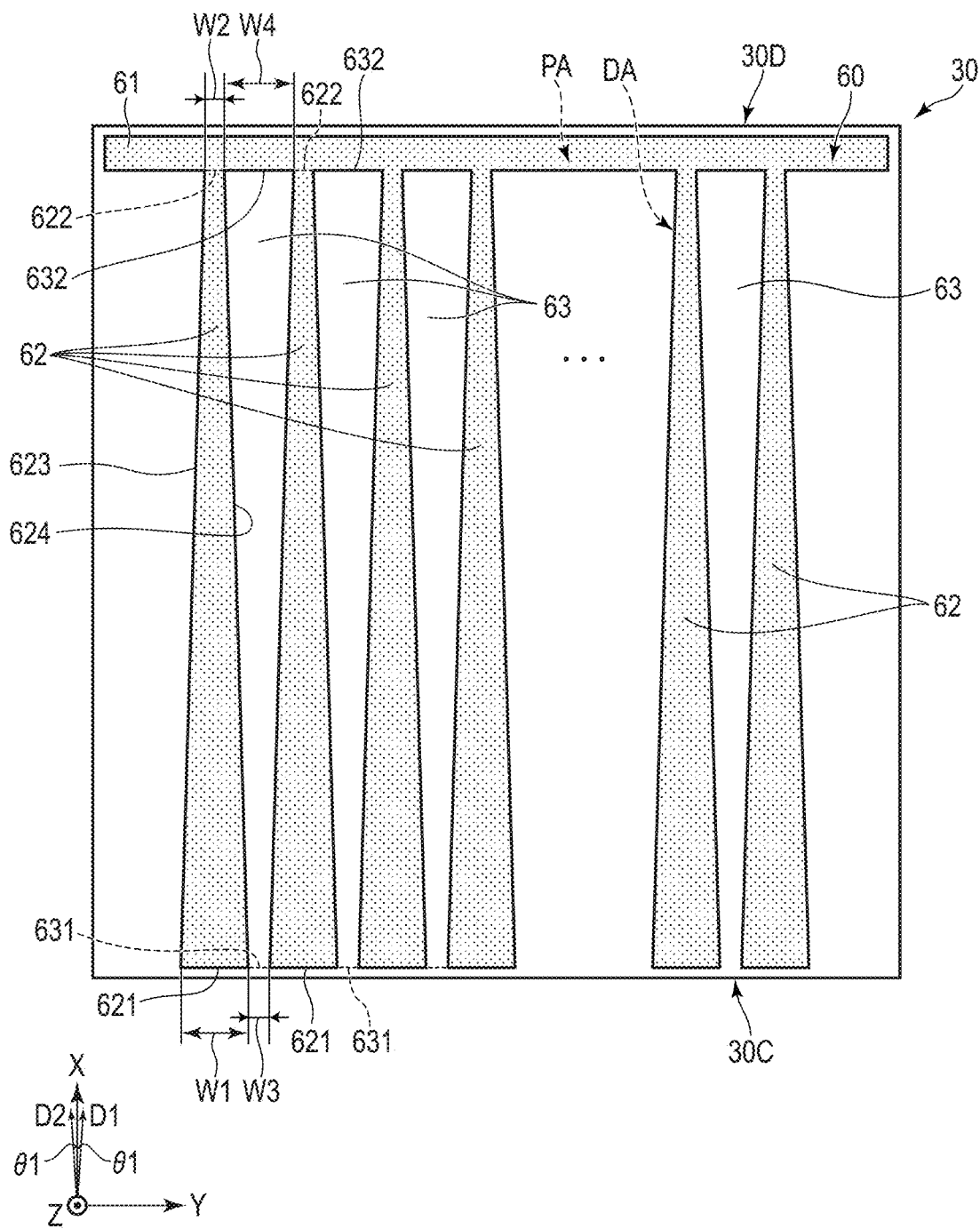
FIG. 4 is a plan view showing a configuration example of a light guide shown in FIG. 3.

FIG. 4 is a plan view showing a configuration example of the light guide 30 shown in FIG. 3. As will described with reference to FIG. 4, the low-refractive layer 60 includes the base 61, the plurality of band portions 62 connected to the base 61, and the plurality of apertures 63 formed between the plurality of band portions 62. For example, the base 61 and the plurality of band portions 62 are formed integrally.

The base 61 is located on the side surface 30D side (side surface 52D side) on the main surface 52A. The base 61 has a substantially rectangular shape extending in the second direction Y. In plan view, the base 61 has a pair of short sides along the first direction X and a pair of long sides along the second direction Y.

The plurality of band portions 62 extend in the first direction X and are spaced apart in the second direction Y. The band portion 62 includes a first end portion 621 on the side surface 30C side (side surface 52C side), a second end portion 622 on a side opposite to the first end portion 621, a first edge 623, and a second edge 624.

The second end portions 622 correspond to portions of the plurality of band portions 62, on the side surface 30D side. The plurality of band portions 62 are connected to the long side of the base 61, on the side surface 30C side, at the second end portions 622. A length of the first end portion 621 along the second direction Y is referred to as a first width W1, and a length of the second end portion 622 along the second direction Y is referred to as a second width W2. In the example shown in FIG. 4, the first width W1 is greater than the second width W2 (W1>W2).

The first edge 623 and the second edge 624 extend in a direction different from the first direction X and the second direction Y, at positions between the first end portion 621 and the second end portion 622. For example, a direction intersecting the first direction X clockwise at an acute angle is defined as a direction D1, and a direction intersecting the first direction X counterclockwise at an acute angle is defined as a direction D2.

Incidentally, the angle θ1 formed between the first direction X and the direction D1 and the angle θ1 formed between the first direction X and the direction D2 are, for example, equal to each other, but are not limited to this example, and the angle formed between the first direction X and the direction D1 may be different from the angle formed between the first direction X and the direction D2.

The first edge 623 extends along the direction D1, and the second edge 624 extends along the direction D2. In the example shown in FIG. 4, both the first edge 623 and the second edge 624 extend linearly, but may be formed in a curved shape. Thus, the band portion 62 has a width which decreases at a constant rate or an arbitrary rate from the first end portion 621 to the second end portion 622 along the first direction X.

The aperture 63 is located between two adjacent band portions 62. The aperture 63 includes a third end portion 631 between the first end portion 621 of one band portion 62 and the first end portion 621 of the other band portion 62, and a fourth end portion 632 between the second end portion 622 of one band portion 62 and the second end portion 622 of the other band portion 62. The fourth end portion 632 is, for example, a portion which is in contact with the long side of the base 61 on the side surface 30C side.

A length of the third end portion 631 along the second direction Y is referred to as a third width W3, and a length of the fourth end portion 632 along the second direction Y is referred to as a fourth width W4. The third width W3 corresponds to an interval between the first end portion 621 of one band portion 62 and the first end portion 621 of the other band portion 62. The fourth width W4 corresponds to an interval between the second end portion 622 of one band portion 62 and the second end portion 622 of the other band portion 62.

The third width W3 is smaller than the fourth width W4 (W3<W4). The aperture 63 has a width which increases at a constant rate or an arbitrary rate from the third end portion 631 to the fourth end portion 632 along the first direction X.

In the example shown in FIG. 4, the low-refractive layer 60 is, for example, located inside the outer shape of the transparent substrates 51 and 52. When the display panel PNL and the light guide 30 overlap, the plurality of band portions 62 overlap with the display area DA, and the base 61 overlaps with the surrounding area PA, in plan view. In the display area DA, the first edges 623 and the second edges 624 which are inclined to the first direction X and the second direction Y, of the plurality of band portions 62, overlap with the display area DA.

In the light guide 30, the side surface 30C side corresponds to the area close to the light source LS, and the side surface 30D side corresponds to the area separated from the light source LS. By constituting the low-refractive layer 60 as described above, the area where the transparent substrate 52 and the plurality of band portions 62 overlap is larger in the area closer to the light sources LS and smaller in the area farther from the light sources LS.

The area where the transparent substrate 52 and the plurality of band portions 62 overlap corresponds to an area where the light made incident on the transparent substrate 30 is hardly made incident on the display panel PNL side. The area where the transparent substrate 52 and the plurality of apertures 63 overlap corresponds to an area where the light made incident on the transparent substrate 30 can be made incident on the display panel PNL side.

Figure 5:
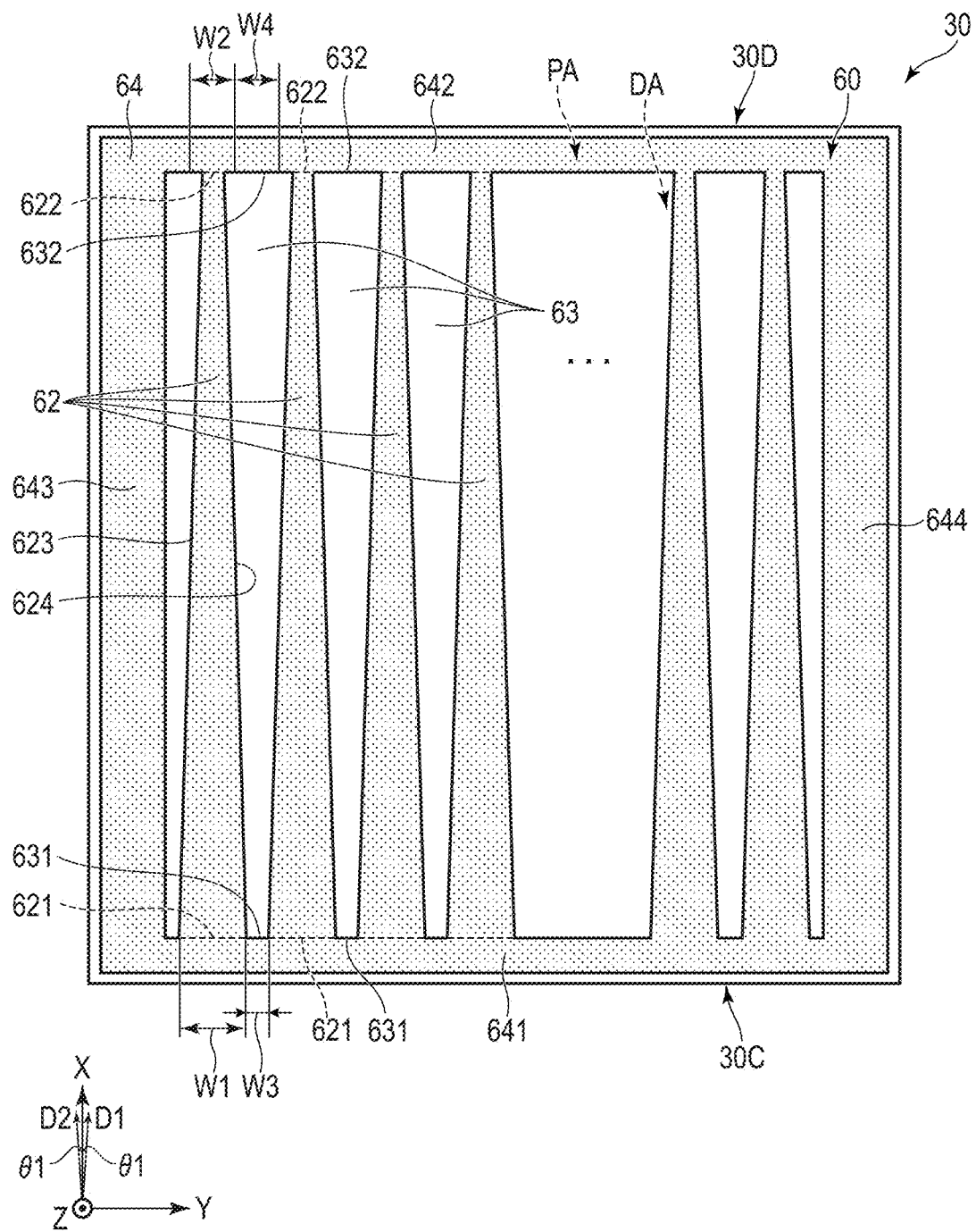
FIG. 5 is a plan view showing another configuration example of the light guide.

FIG. 5 is a plan view showing another configuration example of the light guide 30. In the example shown in FIG. 5, the low-refractive layer 60 includes the plurality of band portions 62, a frame portion 64 surrounding the plurality of band portions 62, and the apertures 63. For example, the plurality of band portions 62 and the frame portion 64 are formed integrally.

The apertures 63 are formed between the plurality of band portions 62, and between the band portions 62 and the frame portion 64. The low-refractive layer 60 shown in FIG. 5 is different from the low-refractive layer 60 described with reference to FIG. 4 in including the frame portion 64 instead of the base 61.

For example, the outer shape of the frame portion 64 is located inside the outer shape of the transparent substrates 51 and 52. The frame portion 64 overlaps with the surrounding area PA, and the inner side of the frame portion 64 corresponds to the display area DA. The frame portion 64 includes a first portion 641 and a second portion 642 which extend along the second direction Y, and a third portion 643 and a fourth portion 644 which extend along the first direction X.

The first portion 641 is located between the side surface 30C and the display area DA, and the second portion 642 is located between the side surface 30D and the display area DA, in the first direction X. The first end portions 621 of the plurality of band portions 62 are connected to the first portion 641, and the second end portions 622 of the plurality of band portions 62 are connected to the second portion 642.

The shape of the low-refractive layer 60 is not limited to the examples shown in FIG. 4 and FIG. 5, but may be other shapes. For example, the amount of light made incident on the display panel PNL side, and the like can be adjusted by changing the shape of the band portions 62 or changing the size of the band portions 62.

FIG. 6 is a cross-sectional view schematically showing a configuration example of the display device DSP. In FIG. 6, the wiring board 1, the IC chip 2, and the like are omitted. Incidentally, the only main portions of the display panel PNL are simplified and illustrated. In the example shown in FIG. 6, the low-refractive layer 60 has the shape described with reference to FIG. 4.

As described with reference to FIG. 3, the light guide 30 includes the transparent substrates 51 and 52, and the low-refractive layer 60. The low-refractive layer 60 is in contact with the main surface 52A of the transparent substrate 52. The light guide 30 further includes an adhesive layer AD0 (first adhesive layer).

The adhesive layer AD0 is located between the transparent substrates 51 and 52, and bonds the transparent substrate 51 to the transparent substrate 52, in the third direction Z. From another viewpoint, the adhesive layer AD0 is in contact with the main surface 51A of the transparent substrate 51 and the main surface 52B of the transparent substrate 52. By bonding the transparent substrate 51 to the transparent substrate 52 through the adhesive layer AD0, it is possible to prevent an air layer from being formed between the transparent substrates 51 and 52.

The adhesive layer AD0 is transparent and formed of, for example, optical clear adhesive (OCA). The adhesive layer AD0 may be formed of optical clear resin (OCR). The transparent substrate 52, the adhesive layer AD0, and the transparent substrate 51 are aligned in this order along the third direction Z.

The display device DSP further comprises an adhesive layer AD1 (second layer) and an adhesive layer AD2. The adhesive layer AD1 is located between the display panel PNL and the light guide 30, and the adhesive layer AD2 is located between the display panel PNL and the cover member 40, in the third direction Z.

The adhesive layer AD1 bonds the transparent substrate 52 to the display panel PNL with the low-refractive layer 60 interposed therebetween. From another viewpoint, the adhesive layer AD1 is in contact with the main surface 20B of the transparent substrate 20 and the low-refractive layer 60. The adhesive layer AD1 is in contact with the main surface 52A of the transparent substrate 52 in an area which overlaps with the plurality of apertures 63 in the low-refractive layer 60.

The adhesive layer AD2 bonds the display panel PNL to the cover member 40. From another view point, the adhesive layer AD2 is in contact with the main surface 10A of the transparent substrate 10 and the main surface 40B of the cover member 40.

The adhesive layers AD1 and AD2 are transparent and are formed of, for example, optical clear adhesive (OCA). The adhesive layers AD1 and AD2 may be formed of optical clear resin (OCR).

The side surface 30C is located directly above the side surface E23, and the side surface 30D is located directly above the side surface E24, in the third direction Z. The side surface 40C is not located directly below the side surface 30C in the third direction Z, but may be located directly below the side surface 30C. The side surface 40D is located directly below the side surface 30D in the third direction Z.

The side surface 40D, the side surface E14, the side surface E24, and the side surface 30D are aligned along the third direction z, but may be displaced. The reflective material RM is provided along the third direction Z, from the side surface 40D to the side surface 51D.

The light source unit 100 overlaps with the extending portion Ex11. The light source LS and the lens LN are provided between the extending portion Ex11 and the wiring board F in the third direction Z. In the example shown in FIG. 6, the cross-section of the support member SA is a rectangular shape. The support member SA has an upper surface SA1 and a side surface SA2.

The upper surface SA1 is opposed to the lens LN. The side surface SA2 is opposed to the side surface E23 of the transparent substrate 20. A reflective material capable of reflecting light may be provided on the upper surface SA1. Light from the lens LN can hardly reach the side surface E23 through the support member SA, by providing the reflective material on the upper surface SA1.

For convenience of description, in the example shown in FIG. 1, the size of the support member SA is smaller than the size of the lens LN in plan view, but the size of the support member SA is, desirably, substantially equivalent to the size of the lens LN in plan view.

In the example shown in FIG. 6, the upper surface SA1 of the support member SA is located above the main surface 20B of the transparent substrate 20 in the third direction Z.

The upper surface SA1 of the support member SA may be located on the same plane as the main surface 20B of the transparent substrate 20.

The lens LN is bonded to the wiring board F by an adhesive material TP and bonded to the support member SA by the adhesive material TP. The support member SA is bonded to the main surface 10B by an adhesive material (not shown). These adhesive materials TP are, for example, double-sided tapes.

The light source LS, the lens LN, and the light guide 30 are aligned in this order along the first direction X. The light source LS and the lens LN are located above the support member SA, and are not opposed to the side surface E23. Therefore, light emitted from the light source LS is hardly made incident from the side surface E23.

In the example shown in FIG. 6, the thickness of each of the transparent substrate 10, the transparent substrate 20, and the cover member 40 is approximately equal. In this example, the thickness refers to the length along the third direction Z. The thickness T52 of the transparent substrate 52 is smaller than, for example, the thickness of each of the transparent substrate 10, the transparent substrate 20, and the cover member 40.

For example, the thickness T52 of the transparent substrate 52 is different from a thickness T51 of the transparent substrate 51. For example, the thickness T52 of the transparent substrate 52 is smaller than the thickness T51 of the transparent substrate 51 (T52<T51). For example, the thickness T52 of the transparent substrate 52 is smaller than a thickness TLS of the light source LS and a thickness TLN of the lens LN (T52<TLS, T52<TLN). The thickness T51 of the transparent substrate 51 is smaller than, for example, the thickness of each of the transparent substrate 10, the transparent substrate 20, and the cover member 40.

A thickness T30 of the light guide 30 is smaller than, for example, the thickness of each of the transparent substrate 10, the transparent substrate 20, and the cover member 40. The thickness T30 of the light guide 30 corresponds to the length from the main surface 51B of the transparent substrate 51 to the main surface 52A of the transparent substrate 52. From another viewpoint, the thickness T30 of the light guide 30 is the sum of the thickness T51 of the transparent substrate 51, the thickness T52 of the transparent substrate 52, and a thickness TA0 of the adhesive layer AD0. The thickness T30 of the light guide 30 may include the thickness of the low-refractive layer 60.

The thickness T30 of the light guide 30 is smaller than, for example, the thickness TLS of the light source LS and the thickness TLN of the lens LN (T30>TLS, T30>TLN). An entire surface of an emission surface LS1 of the light source LS is opposed to the side surface 30C of the light guide 30 with the lens LN interposed therebetween. From another viewpoint, an end of the side surface 30C on the adhesive layer AD0 is opposed to the light source LS in the first direction X with the lens LN interposed therebetween. An end of the wiring board F is opposed to the side surface 51C of the transparent substrate 51.

From the viewpoint of a positional relationship between the light source unit 100 and the light guide 30, the light source LS is located above the low-refractive layer 60 in the third direction Z. From another viewpoint, the low-refractive layer 60 is located between the light source LS and the display panel PNL, in the third direction Z.

The main surface 51B of the transparent substrate 51 is located above the light source LS. Further, the main surface 51B of the transparent substrate 51 is located above the upper surface F10 of the wiring board F. From another viewpoint, the length from the main surface 20B of the transparent substrate 20 to the main surface 51B of the transparent substrate 51 in the third direction Z is greater than the length from the main surface 20B of the transparent substrate 20 to the upper surface F10 of the wiring board F in the third direction Z.

The thickness T52 of the transparent substrate 52 is preferably a thickness on which the low-refractive layer 60 can be formed. For example, the thickness T52 of the transparent substrate 52 is from 700 μm to 1,500 μm (0.7 mm to 1.5 mm), and 2,750 μm (2.75 mm) at maximum.

For example, a thickness T60 of the low-refractive layer 60 is 1 μm (0.001 mm). For example, a thickness TA1 of the adhesive layer AD1 is 125 μm (0.125 mm). The thickness TA0 of the adhesive layer AD0 is greater than, for example, the thickness TA1 of the adhesive layer AD1.

Next, a refractive index of each portion will be described.

A refractive index of the transparent substrate 52 is equivalent to a refractive index of the transparent substrate 51. In this example, "equivalent" is not limited to a case where the difference in refractive index is zero, but implies a case where the difference in refractive index is 0.03 or less. A refractive index of the adhesive layer AD0 is equivalent to the refractive index of the transparent substrates 51 and 52 and greater than the refractive index of the low-refractive layer 60.

A refractive index of the adhesive layer AD1 is equivalent to the refractive index of the adhesive layer AD0 and greater than the refractive index of the low-refractive layer 60. From another viewpoint, the refractive index of the adhesive layer AD1 is equivalent to the refractive index of the transparent substrates 51 and 52. A refractive index of each of the transparent substrates 10 and 20, the adhesive layer AD2, and the cover member 40 is equivalent to the refractive index of the transparent substrates 51 and 52 and greater than the refractive index of the low-refractive layer 60.

The difference between the refractive index of the transparent substrates 51 and 52 and refractive index of the low-refractive layer 60 is, for example, approximately 0.1. As an example, the refractive index of the transparent substrates 51 and 52 is 1.5, the refractive index of the adhesive layer AD0 is 1.5, the refractive index of the low-refractive layer 60 is 1.41, and the refractive index of the adhesive layers AD1 and AD2 is 1.474.

Next, the light emitted from the light source LS will be described.

The light emitted from the light source LS is moderately diffused on the lens LN and is made incident on the light guide 30 from the side surface 30C. The light made incident on the light guide 30 from the side surface 30C reaches the liquid crystal layer LC through the transparent substrates 51 and 52 and the like.

As described above, the refractive index of the low-refractive layer 60 is lower than the refractive index of the transparent substrate 52. For example, the light which travels from the transparent substrate 52 toward the plurality of band portions 62 of the low-refractive layer 60, of the light made incident on the transparent substrate 52 from the side surface 52C, is reflected on an interface between the transparent substrate 52 and the plurality of band portions 62.

For example, the light which travels from the transparent substrate 51 toward the plurality of band portions 62 of the low-refractive layer 60, of the light made incident on the transparent substrate 51 from the side surface 51C, is made incident on the transparent substrate 52 through the adhesive layer AD0 and is reflected on the interface between the transparent substrate 52 and the plurality of band portions 62.

The light which travels toward the main surface 51B, of the light made incident on the transparent substrate 51, is reflected on an interface between the transparent substrate 51 and the air layer. The light which travels from the transparent substrate 52 toward the transparent substrate 51, of the light made incident on the transparent substrate 52, is made incident on the transparent substrate 51 through the adhesive layer AD0 and is reflected on the interface between the transparent substrate 51 and the air layer.

Since the refractive index of the adhesive layer AD0 is equivalent to the refractive index of the transparent substrates 51 and 52, the light is hardly reflected on the interface between the transparent substrate 51 and the adhesive layer AD0 and the interface between the transparent substrate 52 and the adhesive layer AD0.

The light travels inside the transparent substrate 52 while being repeatedly reflected, in the area where the transparent substrate 52 and the plurality of band portions 62 of the low-refractive layer 60 overlap. Of the light, the light which travels toward the area where the transparent substrate 52 and the plurality of apertures 63 of the low-refractive layer 60 overlap is transmitted through the transparent substrate 52 and is made incident on the display panel PNL through the adhesive layer AD1.

The light made incident on the display panel PNL is transmitted to the transparent substrate 20, the liquid crystal layer LC, and the transparent substrate 10 in this order. The light transmitted to the transparent substrate 10, of the light made incident on the display panel PNL, is made incident on the cover member 40 through the adhesive layer AD2. After reflected on the interface between the main surface 40A and the air layer, the light travels toward the display panel PNL.

Since the refractive index of the adhesive layer AD1 is equivalent to the refractive index of the transparent substrate 20, light is hardly reflected on an interface between the adhesive layer AD1 and the transparent substrate 20. Since the refractive index of the adhesive layer AD1 is equivalent to the refractive index of the transparent substrate 52, light is hardly reflected on an interface between the adhesive layer AD1 and the transparent substrate 52.

Since the refractive index of the adhesive layer AD2 is equivalent to the refractive index of the transparent substrate 10, light is hardly reflected on an interface between the adhesive layer AD2 and the transparent substrate 10. Since the refractive index of the adhesive layer AD2 is equivalent to the refractive index of the cover member 40, light is hardly reflected on an interface between the adhesive layer AD2 and the cover member 40.

The area where the transparent substrate 52 and the plurality of band portions 62 overlap is larger in the area closer to the light source LS and smaller in the area farther from the light source LS. For this reason, in the area close to the light source LS (side surface 30C side), the incidence of light from the light source LS on the display panel PNL is suppressed.

In contrast, the incidence of light on the display panel PNL is promoted in the area separated from the light source LS (side surface 30D side). In the area close to the light source LS, it is not that light is not made incident on the display panel PNL at all, but that the light from the aperture 63 is made incident on the display panel PNL, as shown in FIG. 4.

Since the reflective material RM is provided on the side opposite to the light source unit 100, the light reaching the reflective material RM is scattered and reflected by the reflective material RM to travel toward a direction opposite to the first direction X. By providing the reflective material RM, the light leakage to the outside is suppressed, and the light utilization efficiency is improved by reusing the light.

The light incident on the liquid crystal layer LC to which no voltage is applied is transmitted through the liquid crystal layer LC while hardly scattered. In contrast, the light made incident on the liquid crystal layer LC to which the voltage is applied is scattered by the liquid crystal layer LC. The display device DSP enables images to be observed from the main surface 51B side and also enables images to be observed from the main surface 40A side.

The display device DSP is so called a transparent display, and even when the display device DSP is observed from the main surface 51B side or observed from the main surface 40A side, a background of the display device DSP can be observed through the display device DSP.

According to the display device DSP configured as described above, the light guide 30 includes the transparent substrate 51, the transparent substrate 52 having the thickness T52 different from the thickness T51 of the transparent substrate 51, and the adhesive layer AD0 bonding the transparent substrate 51 to the transparent substrate 52.

In the light guide 30, the low-refractive layer 60 is formed on the main surface 52A of the transparent substrate 52. Conditions for forming the low-refractive layer 60 on the transparent substrate are varied according to a thickness of the transparent substrate, types of glass of which the transparent is formed, and the like.

Therefore, by making the thickness of the transparent substrate on which the low-refractive layer 60 is formed constant, the conditions for forming the low-refractive layer 60 on the transparent substrate can be unified. In other words, by making the thickness T52 of the transparent substrate 52 on which the low-refractive layer 60 is formed constant, an adjustment of the conditions for forming the low-refractive layer 60 is not required.

Further, since the light guide 30 includes the transparent substrate 52 separated from the transparent substrate 51, the light guide 30 having a desired thickness can be formed by adjusting the thickness T51 of the transparent substrate 51.

More specifically, by configuring the light guide 30 as including the transparent substrates 51 and 52, the thickness T30 of the light guide 30 can be increased with including the low-refractive layer 60, compared to a configuration including the transparent substrate 52 only.

From another viewpoint, the thickness T3 of the light guide 30 can be increased without changing the conditions for forming the low-refractive layer 60 on the transparent substrate 52. As a result, a thickness of the display device DSP can be increased. The thickness of the display device DSP is a length from the main surface 40A of the cover member 40 to the main surface 51B of the transparent substrate 51.

The light made incident on the display panel PNL by the switching element SW, the pixel electrode PE, the alignment films AL1 and AL2, the common electrode CE, and the like, which are arranged between the transparent substrate 10 and the transparent substrate 20, is attenuated due to undesired absorption and scattering by these various elements while traveling to the area separated from the light source LS.

The undesired absorption and scattering can be a factor for the decrease in luminance in the area separated from the light source LS. For this reason, a difference in luminance is caused between the area close to the light source LS and the area separated from the light source LS, and the luminance gradient is caused in the display device DSP.

By increasing the thickness T30 of the light guide 30 such that the thickness of the display device DSP increases, the number of light reflection in the display device DSP decreases. Therefore, the light can hardly be attenuated by reducing undesired absorption and scattering at various elements arranged on the array substrate AR and the counter-substrate CT, and the light can be made to travel to the area separated from the light source LS.

Therefore, it is possible to suppress the decrease in the brightness in the area separated from the light source LS and decrease the difference between the brightness in the area close to the light source LS and the brightness in the area separated from the light source LS. According to the present embodiment, the degradation in display quality of the display device DSP can be suppressed.

In addition, when the thickness T30 of the light guide 30 is increased by a single transparent substrate, it is difficult to ensure the quality of the light guide 30. Therefore, by increasing the thickness of the light guide 30 by the transparent substrates 51 and 52, it is possible to provide the light guide 30 with stable quality, compared to a case where the thickness T30 of the light guide 30 is increased by the single transparent substrate.

According to the present embodiment, the low-refractive layer 60 of the light guide 30 suppresses the incidence of light from the light source LS onto the display panel PNL in the area close to the light source LS, and promotes the incidence of light onto the display panel PNL in the area separated from the light source LS.

Therefore, it is possible to suppress the decrease in the brightness in the area separated from the light source LS and decrease the difference between the brightness in the area close to the light source LS and the brightness in the area separated from the light source LS. As a result, the degradation in the display quality of the display device DSP can be further suppressed.

According to the present invention, the refractive index of each of the transparent substrates 51 and 52 and the adhesive layer AD0 is equivalent to one another. Therefore, it is possible to optically integrate the transparent substrates 51 and 52 and the adhesive layer AD0, and use the transparent substrates 51 and 52 as the single transparent substrate.

According to the present embodiment, the main surface 52B is located above the light source LS, and the adhesive layer AD0 is opposed to the light source LS. From another view point, the thickness T30 of the light guide 30 is greater than the thickness TLS of the light source LS. Further, the light source LS is located above the low-refractive layer 60. As a result, the entire surface of the emission surface LS1 of the light source LS can be opposed to the side surface 30C, and the most of the light emitted from the light source LS can be made incident on the light guide 30 from the side surface 30C.

Further, even in a case where the thickness T52 of the transparent substrate 52 is smaller than the thickness TLS of the light source LS, it is possible to increase the thickness T30 of the light guide 30, and make the entire surface of the emission surface LS1 of the light source LS opposed to the side surface 30C, by bonding the transparent substrate 52 to the transparent substrate 51 through the adhesive layer AD0.

As described above, according to the present embodiment, a display device DSP capable of suppressing the degradation in display quality can be provided.

In the present embodiment, the light guide 30 includes the low-refractive layer 60, but the light guide 30 may not include the low-refractive layer 60. In the present embodiment, the thickness T52 of the transparent substrate 52 is smaller than the thickness T51 of the transparent substrate 51, but the thickness T52 of the transparent substrate 52 may be greater than the thickness T51 of the transparent substrate 51. In order to increase the thickness T30 of the light guide 30, other transparent substrates may be further provided with the adhesive layer interposed between the main surface 51B of the transparent substrate 51.

All of the display devices that can be implemented by a person of ordinary skill in the art through arbitrary design changes to the display devices described above as embodiments of the present invention come within the scope of the present invention as long as they are in keeping with the spirit of the present invention. Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:
1. A display device comprising:
a display panel displaying an image;
a light guide overlapping with the display panel and including a first side surface; and
a light source emitting light to the first side surface, wherein
the light guide includes a first transparent substrate, a second transparent substrate provided between the display panel and the first transparent substrate, and a first adhesive layer bonding the first transparent substrate to the second transparent substrate,
a thickness of the second transparent substrate is different from a thickness of the first transparent substrate,
the second transparent substrate includes a first main surface opposed to the display panel, a second side surface connected to the first main surface, and a third side surface on a side opposite to the second side surface,
the light guide further comprises a low-refractive layer formed on the first main surface and having a refractive index lower than a refractive index of the second transparent substrate,
the second side surface is included in the first side surface,
the low-refractive layer extends in a first direction from the second side surface toward the third side surface and includes a plurality of band portions spaced apart in a second direction orthogonal to the first direction, and
a length of the band portion in the second side surface side along the second direction is greater than a length of the band portion in the third side surface side along the second direction.

2. The display device of claim 1, wherein
the low-refractive layer extends in the second direction and further includes a base to which portions of the plurality of band portions on the third side surface side are connected.

* * * * *